(12) United States Patent
Pasupathy et al.

(10) Patent No.: US 6,462,912 B1
(45) Date of Patent: Oct. 8, 2002

(54) AIR VANE LATCH INCORPORATING A CAM PIN ON THE ACTUATOR

(75) Inventors: Narayanaswamy Pasupathy; Long Van Ngo, both of San Jose; Mark Joseph Fernandes, Santa Cruz; Ramgopal Battu, Canoga Park, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1701 days.

(21) Appl. No.: 08/554,293

(22) Filed: Nov. 6, 1995

Related U.S. Application Data

(63) Continuation-in-part of application No. 08/116,919, filed on Sep. 7, 1993.

(51) Int. Cl.$^7$ .............................. G11B 5/54; G11B 5/55
(52) U.S. Cl. .................................. 360/256.1; 360/264.1
(58) Field of Search ................................. 360/104–106, 360/137, 256.1, 264.1

(56) References Cited

U.S. PATENT DOCUMENTS

| | | | | | |
|---|---|---|---|---|---|
| 4,538,193 A | * | 8/1985 | Dimmick et al. | ........... | 360/137 |
| 4,647,997 A | * | 3/1987 | Westwood | ................... | 360/105 |
| 4,692,829 A | * | 9/1987 | Campbell | .................... | 360/105 |
| 5,036,416 A | * | 7/1991 | Mastache | .................... | 360/105 |
| 5,043,834 A | * | 8/1991 | Kubo et al. | .................. | 360/105 |
| 5,319,511 A | * | 6/1994 | Lin | ............................ | 360/105 |
| 5,363,261 A | * | 11/1994 | Eckberg et al. | ............. | 360/105 |

\* cited by examiner

Primary Examiner—Allen Cao
(74) Attorney, Agent, or Firm—Derek J. Berger; Shawn B. Dempster

(57) ABSTRACT

An improved latch system for use in a disc drive is provided including an improved means for eliminating tolerances in the parked position of the actuator arm in the landing zone on the disc. According to this system, the latch system includes latch arm having a rotary engaging portion which engages a portion of the transducer support arm or actuator arm in the disc drive to prevent movement of the transducer when the shock appears; this latch arm is directly coupled to an air vane which extends parallel to the edge of the disc in a region nearly adjacent to the actuator arm and at a distance at a center of the disc which is just greater than the radius of the disc so that the vane extends partially along an arc or a line near to the edge of the disc. The latch arm and vane are arranged so that in the presence of disc rotation, wind generated by the disc presses against the vane, and the vane moves away from the disc. As it does so, the latch arm disengages the actuator arm, allowing it to move freely back and forth over the surface of the disc to locate the transducer over various tracks. When disc rotation ceases, the vane returns to its position adjacent the edge of the disc, and the transducer arm returns the transducer to the landing zone. When it does so, a pin which rises above the surface of the actuator arm engages the end of the latch arm. This pin rests against the end of the actuator arm and prevents further movement of the actuator arm under shock. Under normal conditions the accumulated tolerances between the final position of the wind vane, the latch arm, the pin, and the actuator arm which supports the pin would all need to be allowed for in defining the landing zone of the arm. According to the present invention however, an adjustable cam pin having a variable outer radius is supported on the actuator arm. When the assembly of the latch arm and actuator arm are complete the pin is rotated so that it rests firmly against the end of the latch arm; in this position, when the wind vane is at rest, the transducer supporting actuator arm rests exactly on the predefined landing zone, and assembly tolerances which would normally have to be incorporated into the landing zone can be eliminated.

4 Claims, 6 Drawing Sheets

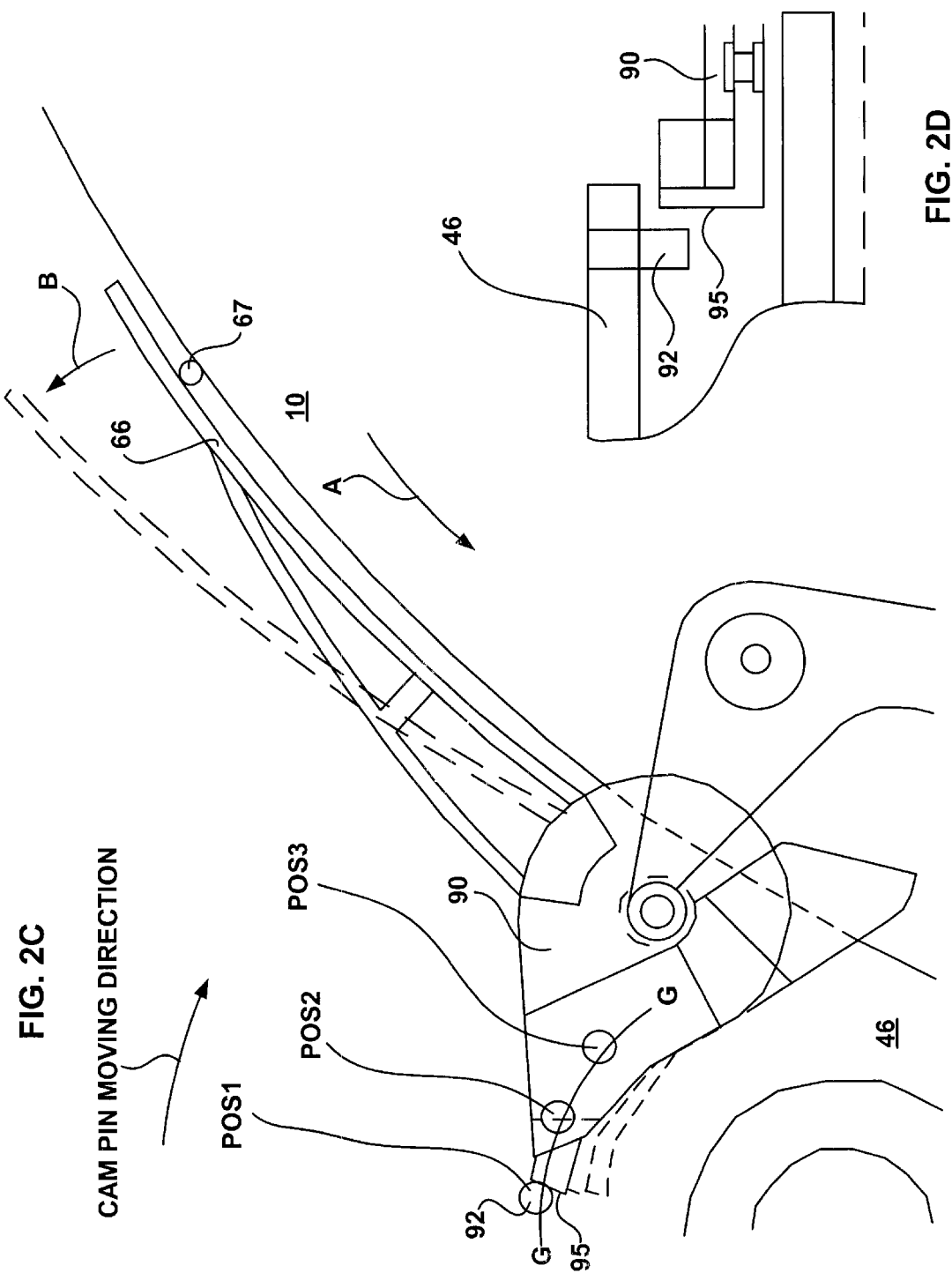

AIR VANE LATCH INCORPORATING A CAM PIN ON THE ACTUATOR

CROSS-REFERENCE TO RELATED APPLICATION

This application is a continuation-in-part of U.S. Application Ser. No. 08/116,919 filed Sep. 7, 1993 and is incorporated herein by reference.

The invention disclosed herein is useful with the invention in U.S. Application Ser. No. 08/553,068, Filed Nov. 3, 1995 and entitled TOP COVER PROFILE FOR INCREASED MARGIN ON AIR VANE LATCH, assigned to the assignee of this invention and incorporated herein by reference.

FIELD OF THE INVENTION

The field of the invention relates to an improved latch system for use in a disc drive and more particularly to means for optimizing the resting position of the actuator in the landing zone.

BACKGROUND OF THE INVENTION

In rotating, non-removable data disc storage devices, a data read/write transducer flies upon a air cushion or bearing in extremely close proximity to the data surface. In many disc drives, particularly those which are of extremely small size, the transducer lands upon and takes off from a predefined landing region, typically located near the center of the disc where the disc is mounted to spindle hub of a spindle hub for rotation. It is possible, when shocks are applied to the disc drive, that the transducer can move or bounce across the surface causing erosion or scarring of the magnetic film coating on the disc surface and leading to hard and soft data failures. In addition, a hard transducer head may dent the surface in response to sharp jarring forces attributable to sharp or rough force handling of the drive. As mentioned above, the transducer flies on an air cushion or bearing as created by the constant speed, high speed rotation of the disc. The characteristics of this air flow have been analyzed and discussed in the prior art as shown for example in U.S. Pat. No. 4,467,997 to Westwood and the IBM Journal of Research and Development 1974 pages 480–488.

As a result of these studies, aerodynamically actuated latches have been designed, analyzed and discussed in the prior art is cited above as well as in U.S. Pat. No. 4,538,193. Such latches have proven difficult to incorporate effectively into small size disc drives. The air vane latch and its location on the base plate adjacent to the disc, as well as the fact that the vane must have an extended latching arm which extends across a pivot to capture the actuator arm, contributes to a build up of tolerances in the air vane assembly itself, the location of the latch, the location of the actuator arm and the like. This leads to significant variations in the head landing position on the disc when it is desired to locate and latch the head gap in the landing zone. In turn, this will result in the loss of usable media space for recording data; additional radial space must be devoted to the landing zone where the head will land and rest because of these accumulated tolerances.

SUMMARY OF THE INVENTION

Therefore, a general object of the present invention is to overcome the limitations and drawbacks associated with present aerodynamically operated latches used with transducer actuator assemblies in a disc drive.

A further object of the invention is to provide an effective aerodynamic transducer latch mechanism within the confines of a miniaturized disc drive structure which does not introduce an accumulation of tolerances such that the actuator arm cannot be accurately parked in a limited landing zone region on the inner radius of the disc.

A further objective of this invention is to provide a latch design which integrates the aerodynamic latch and the actuator arm which it is intended to latch in place so that the aerodynamic latch when it is in its locking position accurately and reliably holds the actuator arm in a very accurately fixed and stable position on the surface of the disc.

According to one aspect of the invention, there is provided an improved latch system for use in a disc drive including an improved means for eliminating tolerances in the parked position of the actuator arm in the landing zone on the disc. According to this system, the latch system includes latch arm having a rotary engaging portion which engages a portion of the transducer support arm or actuator arm in the disc drive to prevent movement of the transducer when the shock appears; this latch arm is directly coupled to an air vane which extends parallel to the edge of the disc in a region nearly adjacent to the actuator arm and at a distance at a center of the disc which is just greater than the radius of the disc so that the vane extends partially along an arc or a line near to the edge of the disc. The latch arm and vane are arranged so that in the presence of disc rotation, wind generated by the disc presses against the vane, and the vane moves away from the disc. As it does so, the latch arm disengages the actuator arm, allowing it to move freely back and forth over the surface of the disc to locate the transducer over various tracks. When disc rotation ceases, the vane returns to its position adjacent the edge of the disc, and the transducer arm returns the transducer to the landing zone. When it does so, a pin which rises above the surface of the actuator arm engages the end of the latch arm. This pin rests against the end of the actuator arm and prevents further movement of the actuator arm under shock.

Under normal conditions the accumulated tolerances between the final position of the wind vane, the latch arm, the pin, and the actuator arm which supports the pin would all need to be allowed for in defining the landing zone of the arm. According to the present invention however, an adjustable cam pin having a variable outer radius is supported on the actuator arm. When the assembly of the latch arm and actuator arm are complete the pin is rotated so that it rests firmly against the end of the latch arm; in this position, when the wind vane is at rest, the transducer supporting actuator arm rests exactly on the predefined landing zone, and assembly tolerances which would normally have to be incorporated into the landing zone can be eliminated.

Other features and advantages of the present invention would be understood by a person of skill in the art who studies the present invention disclosure as explained with reference to the following figures wherein.

DETAILED DESCRIPTION OF A PREFERRED EMBODIMENT

Figure 1:
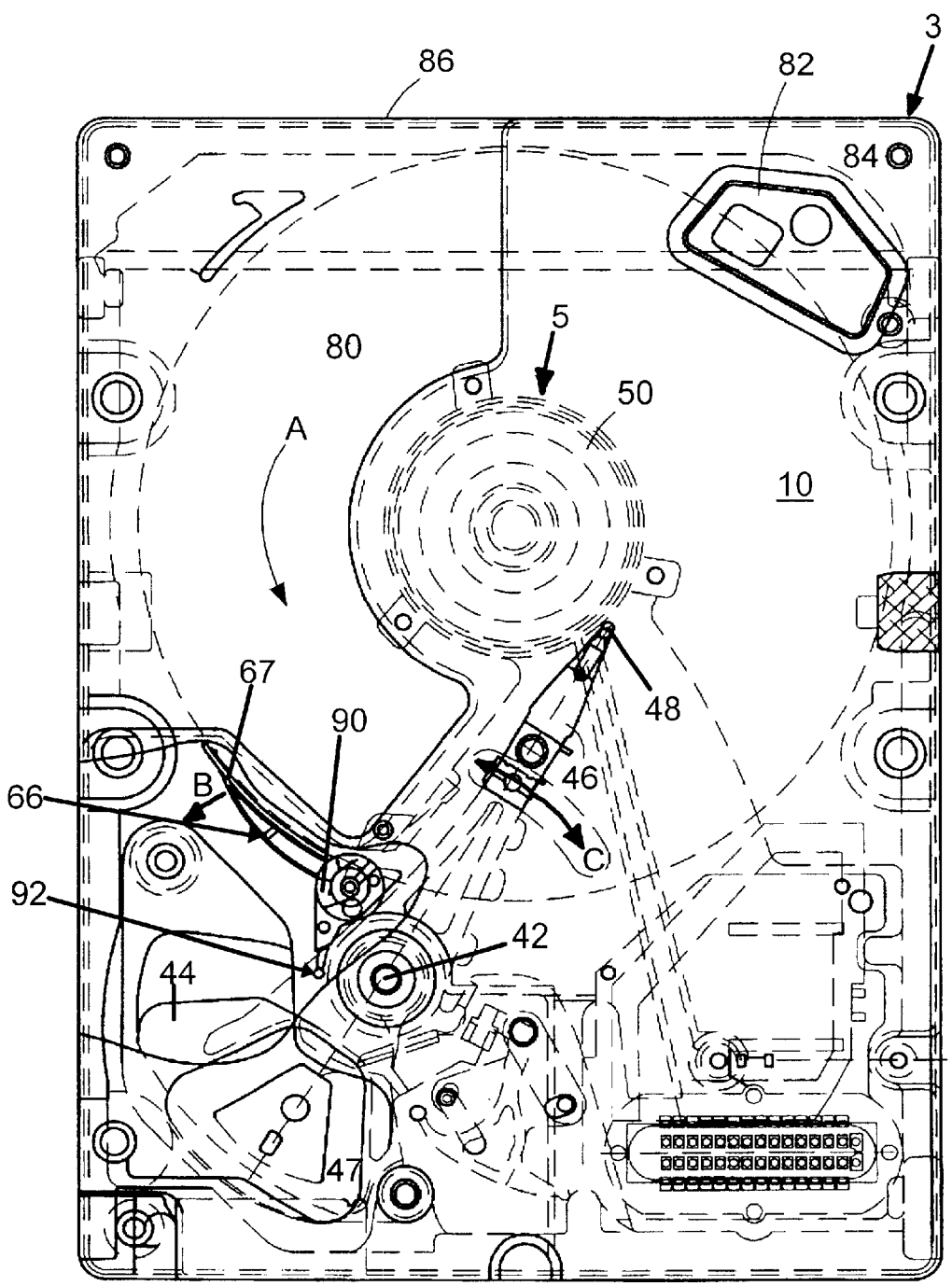
FIG. 1 is a top plan view of a miniaturized disc drive incorporating the present invention.
Figure 2A:
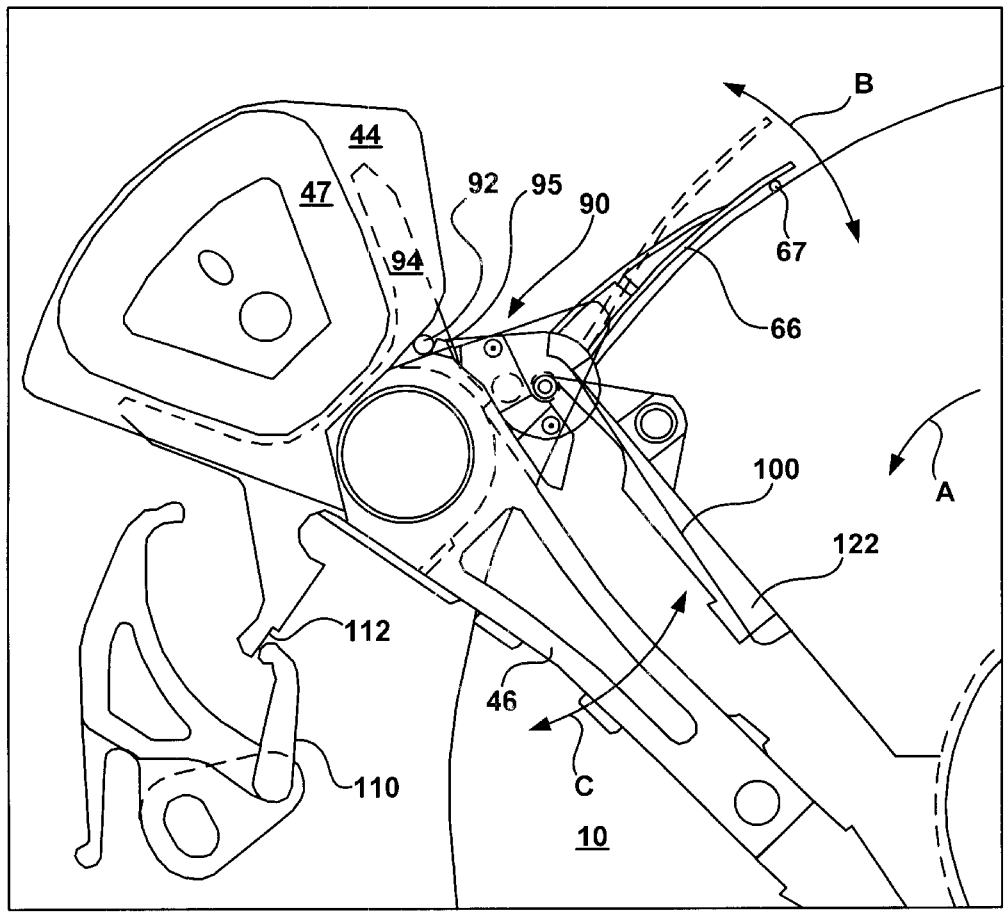
FIG. 2 is an enlarged plan view of the disc drive of FIG. 1 provided to emphasize certain details of the present invention.
Figure 2B:
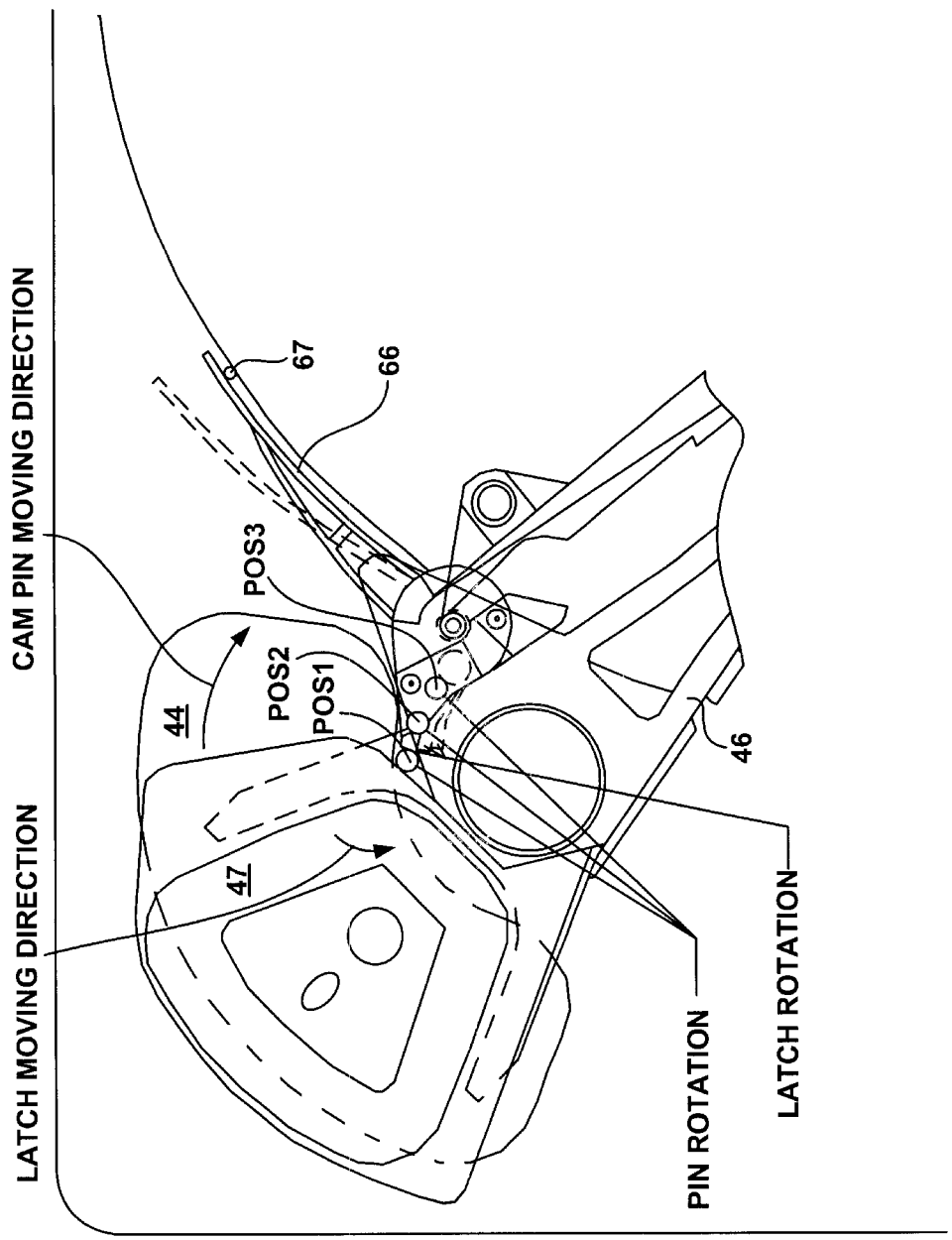

FIG. 1 shows in a plan view the basic elements of a miniaturized disc drive incorporating a latch and adjustment cam according to the present invention. Briefly, it can be seen that as the disc spins in the direction of the arrow A, in a counterclockwise direction, the spinning disc creates a moving sheath of air which acts against the air vane flag 66, causing movement of the flag in the direction of the arrow B with sufficient force to unlatch a latch attached to the vane (not shown) and allow the actuator arm 40 to move freely. An example of such a latch is described in the Hickox et al. application Ser. No. 08/116,919 filed Sep. 7, 1993 and incorporated herein by reference. Also shown in this figure is a miniaturized disc drive including a unitary housing generally indicated at 3 and a disc spindle 5 having an axis of rotation 7. The spindle 5 is coupled directly to an electronically commutated brushless DC spindle motor supported from the base casting of the housing and rotating at a constant speed to rotate the data storage disc 10 in the direction of arrow A. This rotation typically occurs at a predetermined and constant angular velocity. The data storage disc provides data storage on tracks generally indicated at 20 on the upper and lower surfaces of the disc 10. The surfaces are characterized by the presence of suitable magnetic storage media which may be materials such as are well known in the art and which are coated, plated or deposited on the surfaces of the disc.

The disc 10 in this example is preferably about 47 millimeters in diameter, although the present invention may be useful with both smaller and larger disc drive sizes. More particularly, this invention is especially useful and important in disc drives utilizing wind vane activated latches wherein it is especially important to confine the landing zone for the transducer to a narrow region so that no track storage space is lost. The data storage locations on the surface of disc 20 are accessed by rotary actuator arm assembly 40 which is bidirectionally rotatable and is journalled to the base casting 4 at an axis of rotation 42. The arm rotates along an arc generally indicated by the arrow C in FIG. 1. The arm assembly includes a coil 47 which closely overlies a permanent magnet in a region generally indicated at 44. Energization of the coil causes selective movement of the actuator arm along a path C to move the transducer support arm and thereby transducer 48 from track to track over the set of data storage tracks 20.

The transducer support arm extends out over the surface of the disc 10 and supports the slider assembly for the transducer 48 to allow it to fly 3–15 microinches above the data surface on an air bearing or cushion of air resulting from the disc rotation. In this FIG. 1, the transducer is shown centered in the landing zone, with the wind vane 66 closed and resting against closure pin 67 and the latch 90 engaging the adjustment cam pin 92.

The relationship of these elements can be better understood by reference to FIGS. 2A, 2B, 2C and 2D which are successively more detailed views of the relationship between latch end 95 and cam pin 92 which also shows the vane 66 in the closed position against pin 67 and the end 95 of latch 90 resting against the pin 92 supported on an extended finger 94 of the actuator arm 40. As shown in the dotted lines of FIGS. 2A–2C, when the disc 10 was rotating in the direction of arrow A, then the vane moved in the direction of arrow B to the dotted position; as it did so, the pin contracting end 95 of the latch swung out of the path of the pin 92 on the actuator. This allowed the actuator arm to move freely back and forth along the path marked by the arrow C (of FIG. 1).

In normal operation, the wind created by the rotation of the disc 10 causes the vane to remain swung out away from the edge of the disc. When rotation stops, the actuator arm 46 is urged to the landing zone position shown in FIG. 1 and again in FIG. 2 by the motor comprising coil 47 and magnet 44. The motor 44, 47 positions the actuator arm 46 as close as possible to the landing zone.

The objective of course is to consistently and reliably park the transducer in the same landing zone position. This is accomplished by virtue of the fact that as the vane 66 swings closed, it always returns to the same home position as defined by pin 67. Before the vane closes, the pin 92 supported beneath actuator arm 46 is already substantially in its home landing zone position POS1 as positioned by the motor moving actuator arm 46. The various possible positions for pin 92 as actuator arm 46 moves are illustrated as POS1, POS2, POS3 in FIG. 2B. It is also apparent that the latch arm 90 and actuator arm 46 are moving in parallel planes; as shown in FIG. 2D, the pin 92 moves over the latch arm 90 to avoid any interference contact during operation of the disc drive. The latch finger 97 itself moves aside, out of the path G—G of pin 92 when the wind vane 66 opens. The pin 92 is contacted only by surface 95 on the rear of the latch 90.

When contact occurs, the FIG. 2C pin is at position POS1, and the actuator arm 46 has the transducer close to the landing zone. If the actuator arm is not already in the optimum landing zone position then the ramping effect of the surface 90 moving with the wind vane 66 as it moves to the closed position against pin 67 will cause the surface 95 to move the pin 92 and the actuator arm which supports the transducer to the optimum parked position.

Excessive movement of the actuator arm beyond the landing zone is prevented by the fixed crash stop 110 (FIG. 2A) on the opposite side of the actuator arm which is supported from the base and engages the extended actuator arm surface 112.

It has been found that by virtue of this interaction, that the optimum defined landing zone can be reduced from plus or minus 0.020 inches to plus or minus 0.003 inches on either side of an optimum landing position.

Figure 4A:
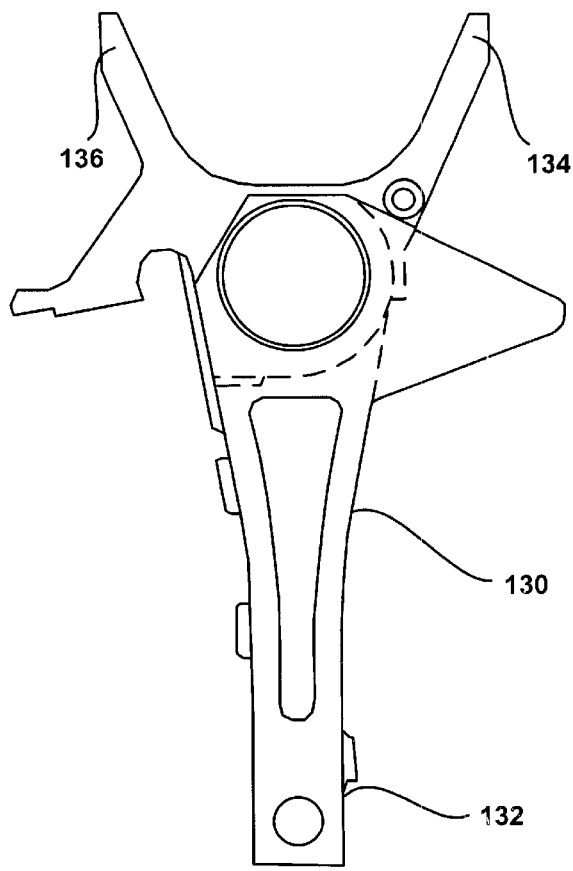
FIGS. 4A, 4B, 4C and 4D are exaggerated views of the actuator arm and the pins supported by the actuator arm to cooperate with the wind vane of the present invention.
Figure 3:
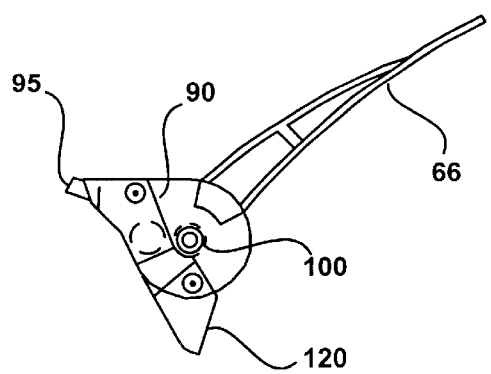
FIG. 3 is a top view of the wind vane and latch arm of the present invention.
Figure 4D:
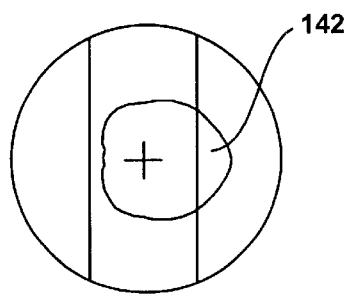
Figure 4C:
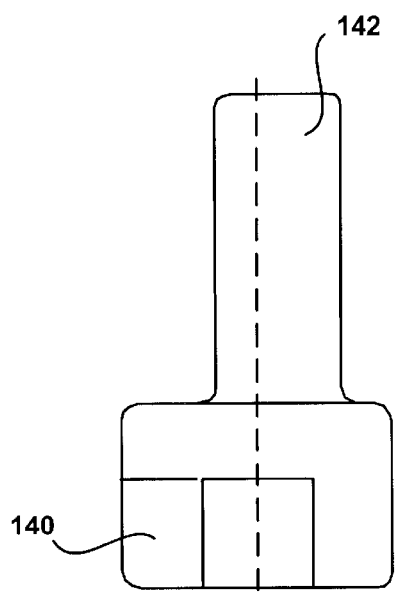
Figure 4B:
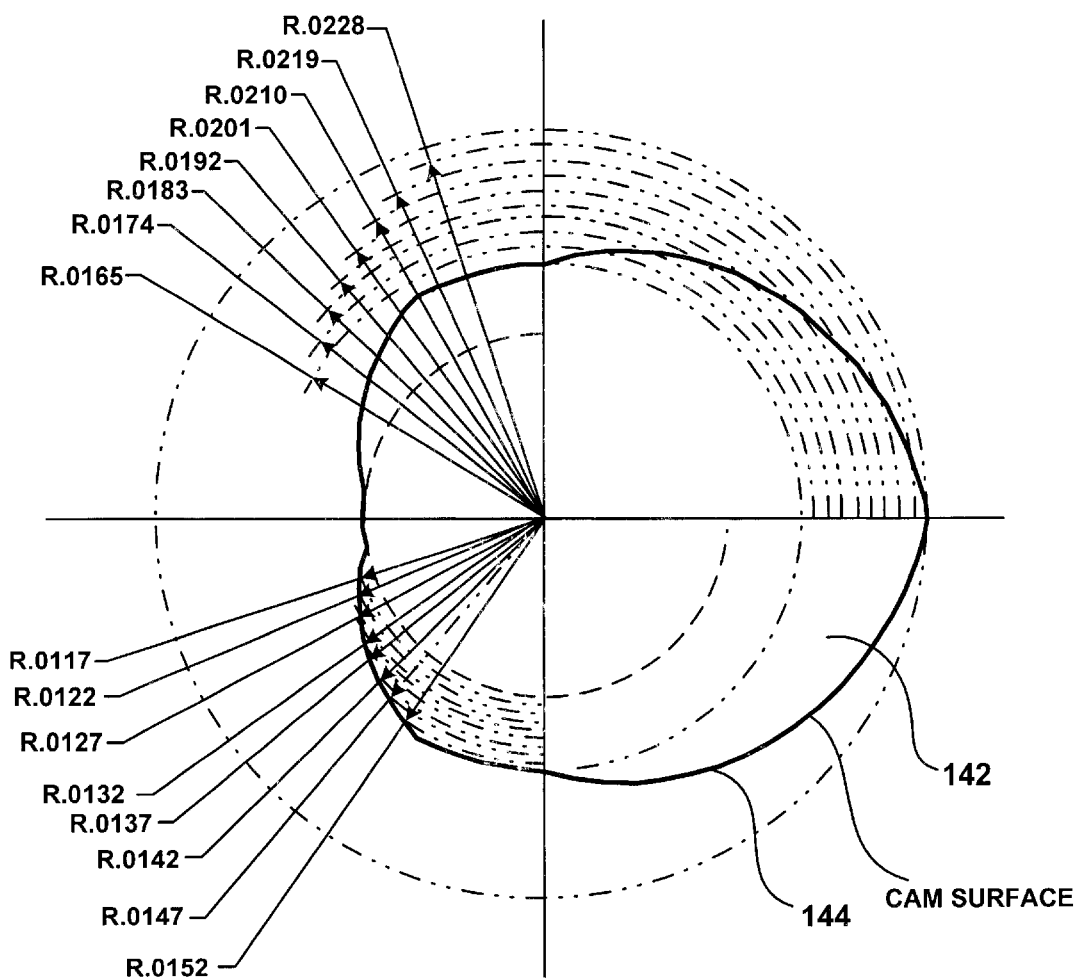

FIG. 3 provides details of the wind vane 66 and the latch 90 including its extended tapered surface 95 which contacts the pin. The latch and wind vane also support a balance counterweight 120 which is provided to balance the position of the wind vane 66 and prevent unnecessary or undesired movements of the vane during external shock. The movement of the vane to the latch position is also controlled by the spring 100 which is coiled beneath the latch 90 at one end, the opposite end being captured in a spring bracket 122 (FIG. 2) so that some bias force is always exerted against the wind vane 66 moving it towards the home position (as is well known in this field and is described in the above incorporated patent application). The actuator arm with which this invention is especially useful is of a type well known in this technology and shown in FIG. 4A. The arm 130 includes a gimble support 132 at one end, and fingers 134, 136 for supporting the coil 47 which is an essential part of the voice coil motor which moves the arm. The pin 92 is shown supported on one of the arms 134 and is shown in greater detail in FIG. 4B as comprising a base 140 and an upright section 142. An important feature of the invention as shown especially in FIGS. 4C and 4D is that the top portion 142 of the pin has a constantly varying radius 144. The pin 142 is rotatable in the arm after the arm and latch have been assembled in the base. During assembly of the disc drive the actuator arm is located to place the transducer directly on the landing zone, in the desired nominal radius location and locating the vane 66 is located against the pin 67, this cam 142 can now be rotated so that an exact tolerance fit between the location of the vane and the location and arm and transducer is achieved.

In this way, when the actuator arm returns the transducer to the landing zone, and the wind vane 66 closes behind it, the latch arm presses surface 95 of latch finger 97 against the variable radius 144 of the pin 142; in response, the cam 142 always positions the actuator arm exactly on the landing zone target track, so that no surface area of the disc is wasted or unnecessarily dedicated to a transducer landing region.

Having described the above embodiment of the invention, it can be appreciated that the objects of the invention can be fully achieved thereby. It will also be understood by those of skill in this field that changes in construction and changes in the embodiments of the application will suggest themselves without departure from the spirit and scope of the invention. The disclosures and description herein are illustrative and are not intended to be in any sense limiting in the sense that only the exact embodiment described is useful. The scope of the present invention is intended to be defined by the following claims.

What is claimed is:

1. A latch system for use in a disc drive, the latch comprising a latch arm for engaging a transducer support arm of the disc drive to substantially prevent movement of the transducer support arm of said drive away from a landing zone on a disc a vane coupled to said latch arm for moving said latch arm with movement of said vane, said vane being located at a distance from the center of said disc of the disc drive greater than the radius of the disc, rotation of the disc generating wind pressing against the vane to move the vane away from the disc and causing the engagement portion to disengage from the vane arm, the disc drive further comprising a pin extending from said transducer support arm, said transducer support arm and said latch moving in planes parallel to said disc so that said latch engages said pin to hold said transducer support arm in said landing zone, and wherein said pin is formed with a varying radius perpendicular to the plane of said latch and is rotatable in said support arm, so that said pin takes up any tolerances between a parking position of said wind vane and latch and said landing zone position for transducer arm.

2. A latch system for use in a disc drive as claimed in claim 1 wherein a rearward extending edge of said latch engages said pin to hold said transducer support arm in said landing zone.

3. A latch system for use in a disc drive as claimed in claim 1 wherein said disc drive includes a housing having a base supporting a second pin perpendicular to the plane of said latch to define the parking position of said vane and said latch.

4. A latch system as claimed in claim 3 wherein said rearward edge of said latch is inclined, to cause said transducer support arm to be reliably urged toward said landing zone.

* * * * *